United States Patent
Zheng

(10) Patent No.: US 7,978,985 B2
(45) Date of Patent: Jul. 12, 2011

(54) CLIPPING CORRECTION SYSTEM AND METHOD FOR CORRECTING CLIPPED SIGNALS IN A RECEIVER

(75) Inventor: Jun Zheng, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 644 days.

(21) Appl. No.: 12/117,721

(22) Filed: May 8, 2008

(65) Prior Publication Data

US 2009/0278583 A1    Nov. 12, 2009

(51) Int. Cl.
*H04B 10/06* (2006.01)
(52) U.S. Cl. .......................... 398/208; 398/210
(58) Field of Classification Search ............... 398/208, 398/210
See application file for complete search history.

(56) References Cited

U.S. PATENT DOCUMENTS

| | | | |
|---|---|---|---|
| 5,510,743 A | | 4/1996 | Shi |
| 5,680,238 A | * | 10/1997 | Masuda .................. 398/76 |
| 7,605,730 B2 | * | 10/2009 | Tomioka et al. .......... 341/132 |
| 2007/0147848 A1 | | 6/2007 | Vieira et al. |

* cited by examiner

*Primary Examiner* — Leslie Pascal
(74) *Attorney, Agent, or Firm* — Grossman Tucker Perreault & Pfleger, PLLC; Norman S. Kinsella

(57) ABSTRACT

A system and method for restoring a clipped signal may be used in an optical receiver that detects a clipped modulated optical signal. The clipped modulated optical signal is detected to produce a clipped electrical signal including a series of clipped negative peaks and corresponding positive peaks. The clipped signal may be corrected by detecting at least one trigger peak preceding one or more clipped negative peaks to be restored and generating a replacement tip signal segment for the clipped negative peak(s) to be restored. The replacement tip signal segment may be combined with the clipped electrical signal such that the replacement tip signal segment coincides with a clipped end of the clipped negative peak to be restored to produce a restored negative peak.

20 Claims, 6 Drawing Sheets

CLIPPING CORRECTION SYSTEM AND METHOD FOR CORRECTING CLIPPED SIGNALS IN A RECEIVER

TECHNICAL FIELD

The present invention relates to modulated optical systems and more particularly, to clipping correction systems and methods for correcting clipped signals in a receiver.

BACKGROUND INFORMATION

A laser may be used as an optical transmitter that transmits light at a given wavelength. In a directly-modulated electrically pumped semiconductor laser such as a laser diode, the power (i.e., amplitude) of the laser light may be modulated by corresponding modulation of the electrical current that drives or pumps the laser. The relationship between the light output and the input current for such a laser may be represented using a transfer curve or L-I (light-current) curve. The set point of the L-I curve may be selected so as to maximize the linearity of the laser output in response to the modulation, within the expected range of operation of the output produced by the laser. Although the laser output may be generally linear along a significant portion of the L-I curve, the light output may attain a zero-power level when the input current falls below a threshold current level, which results in an effect known as clipping.

In a communications system where multiple channels are transmitted, such as a CATV system, multiple analog signals corresponding to the multiple channels may be combined into a wide-band multichannel RF signal, which drives a laser to produce a multichannel modulated optical signal. The multiple analog signals may include multiple modulated analog carriers that may be combined, for example, using frequency division multiplexing techniques. One or more digital signals modulated using digital modulation, such as quadrature amplitude modulated (QAM), may also be combined with the modulated analog carrier signals, for example, using subcarrier multiplexing (SCM) techniques. In some systems, for example, as many as 110 channels may be transmitted over a frequency range of about 50 MHz to 750 MHz.

Because the modulation may carry several channels of information at different frequencies, there may be a very large swing of the input drive current in either direction. When many signals are summed and are randomly distributed in both frequency and phase, the ratio of peak-to-average voltage rarely exceeds 14 dB (though with occasional higher peaks). In a CATV system, however, the downstream spectrum is not random. Peak voltage conditions may occur, for example, when a large number of carriers are harmonics of a common root frequency and the carrier phases are aligned. In that case, the time domain waveform can resemble a string of impulses spaced by a time interval equal to the period of the common root frequency. As a result of this occasionally occurring peak voltage (and thus peak drive current) condition, the laser may be driven into hard limiting, causing clipping, when a sufficient number of carriers are in phase alignment. This is particularly true in the case of directly modulated laser diodes, as described above, where a sharp knee occurs in the transfer function below which the light output reaches a zero-power level.

In other words, there will be clipping when the instantaneous sum of various signals causes the drive current to swing too far in the "downward" direction and below the threshold current that turns on the laser. When such clipping occurs, intermodulation products (i.e., clipping-induced distortion) and noise may be generated, which may result in bit errors in the optical output of the laser. Systems including a digital signal (e.g., a QAM signal) added to the analog channels are even more sensitive to noise arising from clipping.

Each channel in a multichannel optical communications system may be driven or modulated up to a certain maximum optical modulation index (OMI). In general, a higher OMI per channel increases the channel-to-noise ratio (CNR). Driving the individual channels too much, however, may cause clipping when the channels line up, as described above. In some systems, each channel cannot be driven more than about 2 to 3% OMI because, if the channels were to line up, the total modulation of the laser would substantially exceed 100%. If clipping could be reduced or corrected, increasing the OMI per channel would be possible to improve CNR.

Systems and methods have been used to reduce or prevent clipping by modifying the RF signal and/or the bias current provided to the laser. Such systems and methods, however, may not be effective in some cases or may cause other undesirable effects.

BRIEF DESCRIPTION OF THE DRAWINGS

These and other features and advantages will be better understood by reading the following detailed description, taken together with the drawings wherein.

DETAILED DESCRIPTION

A clipping correction system and method may be used to correct a clipped electrical signal by restoring one or more clipped negative peaks in the clipped signal. The clipped negative peaks may be restored by detecting one or more trigger peaks indicating the occurrence of clipping and by generating replacement tips for one or more clipped negative peaks following the detected trigger peak, as will be described in greater detail below.

As used herein, to "restore" a clipped negative peak refers to replacing at least a portion of the clipped negative peak such that the restored negative peak simulates the original negative peak prior to being clipped. Restoration of a clipped negative peak does not require that the clipped negative peak be returned to its exact previous condition prior to being clipped. As used herein, to "correct" clipping refers to restoration of at least some of the clipped negative peaks in a clipped signal such that artifacts or other adverse effects caused by the clipping are reduced. Clipping correction does not necessarily require complete restoration of all clipped negative peaks, nor does it require that the corrected signal be identical to the original unclipped signal.

Figure 1:
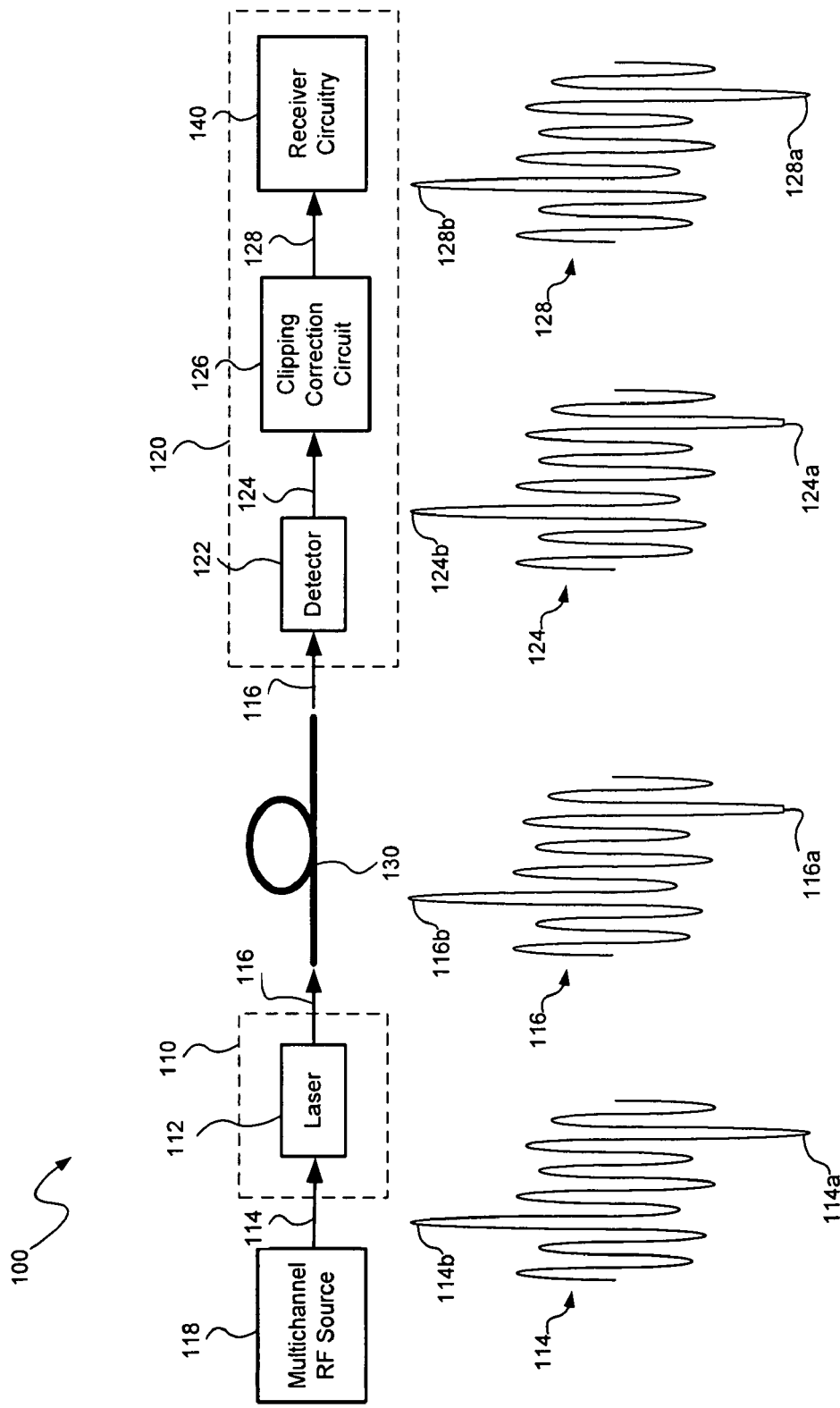
FIG. 1 is a functional block diagram of a multichannel modulated optical system in which a clipped signal is corrected, consistent with embodiments of the present disclosure.

Referring to FIG. 1, a clipping correction system and method may be used to correct a clipped signal in a modulated optical system 100. The optical system 100 includes an optical transmitter 110, an optical receiver 120 and optical fiber 130. The optical transmitter 110 transmits a modulated optical signal over the optical fiber 130 to the optical receiver 120.

The optical transmitter 110 includes a laser 112 that may be modulated by an RF input signal 114 to produce a modulated optical signal 116 in response to the RF signal 114. The RF input signal 114 may be a multichannel RF input signal generated by a multichannel RF source 118. The optical transmitter 110 may also include other circuitry and/or components (not shown) such as, for example, one or more predistortion circuits and a laser drive circuit. The RF input signal 114 may include negative peaks, such as negative peak 114a, and corresponding positive peaks, such as positive peak 114b. Because of the symmetry of the RF signal 114, the negative peak 114a and corresponding positive peak 114b have the same or a similar magnitude. The modulated optical signal 116 generally corresponds to the RF input signal 114 except certain negative peaks may be clipped such as clipped negative peak 116a. The modulated optical signal 116 also includes positive peaks that correspond with the clipped negative peaks, such as corresponding positive peak 116b corresponding to clipped negative peak 116a.

In one embodiment, the multichannel RF signal 114 (shown in simplified form) may include multiple superimposed modulated analog carriers at different frequencies. The multiple modulated analog carriers may be modulated using modulation techniques known to those skilled in the art, such as amplitude modulation, and may be combined using multiplexing techniques known to those skilled in the art, such as frequency division multiplexing. The multichannel RF signal 114 may also include one or more digital signals modulated using digital modulation, such as quadrature amplitude modulation (QAM). Those skilled in the art will recognize that various modulation and multiplexing techniques may be used to generate the multichannel RF signal.

In one embodiment, the multichannel RF source 118 may include headend equipment in a CATV system and the multichannel RF signal 114 may be a downstream CATV signal. Examples of downstream multichannel CATV signals include 77 channels transmitted over a frequency range of about 50 MHz to 550 MHz and 110 channels transmitted over a frequency range of about 50 MHz to 750 MHz. Each channel in a downstream multichannel CATV signal may include a video carrier, a color subcarrier and an audio carrier. Other types of signals and frequency ranges may also be transmitted.

Each channel in the multichannel RF signal 114 may be driven or modulated up to a certain optical modulation index (OMI) depending upon a desired channel-to-noise ratio (CNR). In one embodiment, the OMI of at least some of the channels may be at least about 4% and more specifically about 5%. When multiple modulated carriers of the multichannel RF signal 114 align in phase, the sum of the voltage of the aligned carriers may result in a peak voltage condition. When the optical modulation index (OMI) of each channel exceeds a certain level (e.g., exceeding about 3% OMI per channel), the peak voltage condition may result in a higher occurrence of negative voltage spikes or peaks that cause the laser input current to fall below a threshold current of the laser 112, resulting in clipping in the modulated optical signal 116.

The clipped modulated optical signal 116 may be carried over the optical path 130 to the optical receiver 120. The optical receiver 120 may include a detector 122 that detects the modulated optical signal 116 and converts the modulated optical signal 116 into a detected clipped RF signal 124. The detector 122 may include one or more photodiodes and other circuitry known to those skilled in the art for detecting optical RF signals. The detected clipped RF signal 124 includes clipped negative peaks (e.g., clipped negative peak 124a) and corresponding positive peaks (e.g., corresponding positive peak 124b) similar to the modulated optical signal 116.

The optical receiver 120 further includes a clipping correction circuit 126 that restores one or more clipped negative peaks of the detected RF signal 124 to produce a corrected RF signal 128 including one or more restored negative peaks, such as restored negative peak 128a. The clipping correction circuit 124 may restore the clipped negative peak 124a by generating a replacement peak in response to detecting a trigger peak (e.g., corresponding positive peak 124b) preceding the clipped negative peak 124a and by combining the replacement peak with the clipped RF signal 124, as will be described in greater detail below. By detecting the trigger peak, the clipping correction system 126 can predict when clipping will occur, which facilitates the clipping correction process.

The optical receiver 120 may also include other receiver circuitry 140 for processing the corrected RF signal 128. The receiver circuitry 140 may include, for example, filters, demodulators, and/or decoders used to recover the modulated analog carriers and digital signals from the RF signal 128. The receiver circuitry 140 may provide these signals to an appropriate device, such as a television.

Figure 2A:
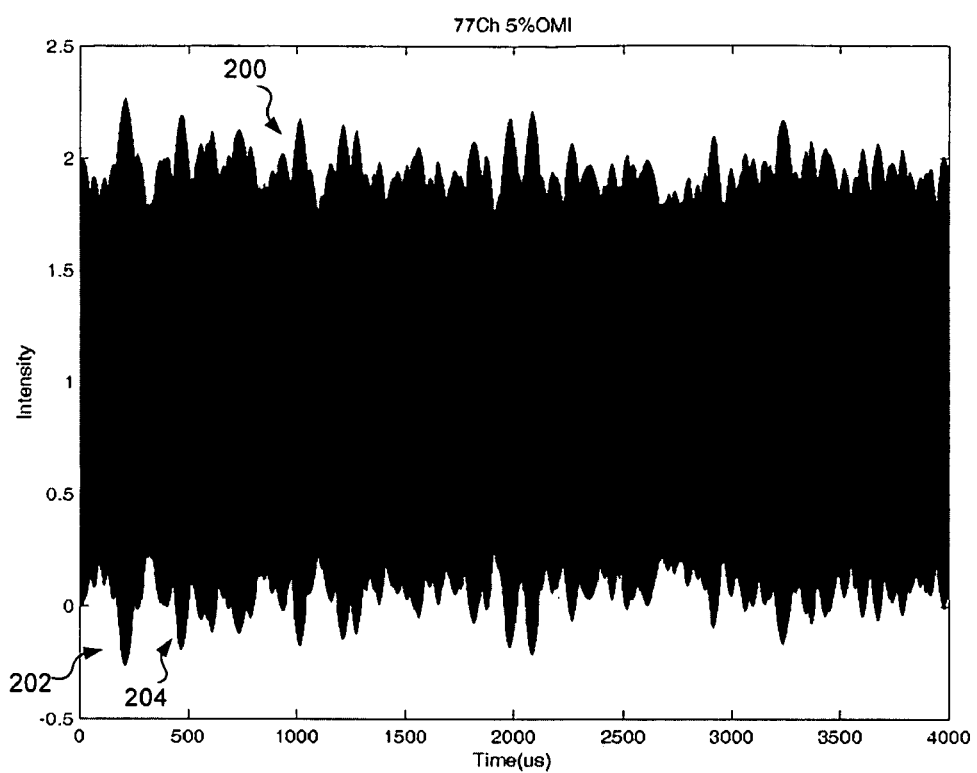
FIGS. 2A and 2B illustrate portions of an exemplary waveform of a multichannel RF signal in a multichannel modulated optical system.
Figure 2B:
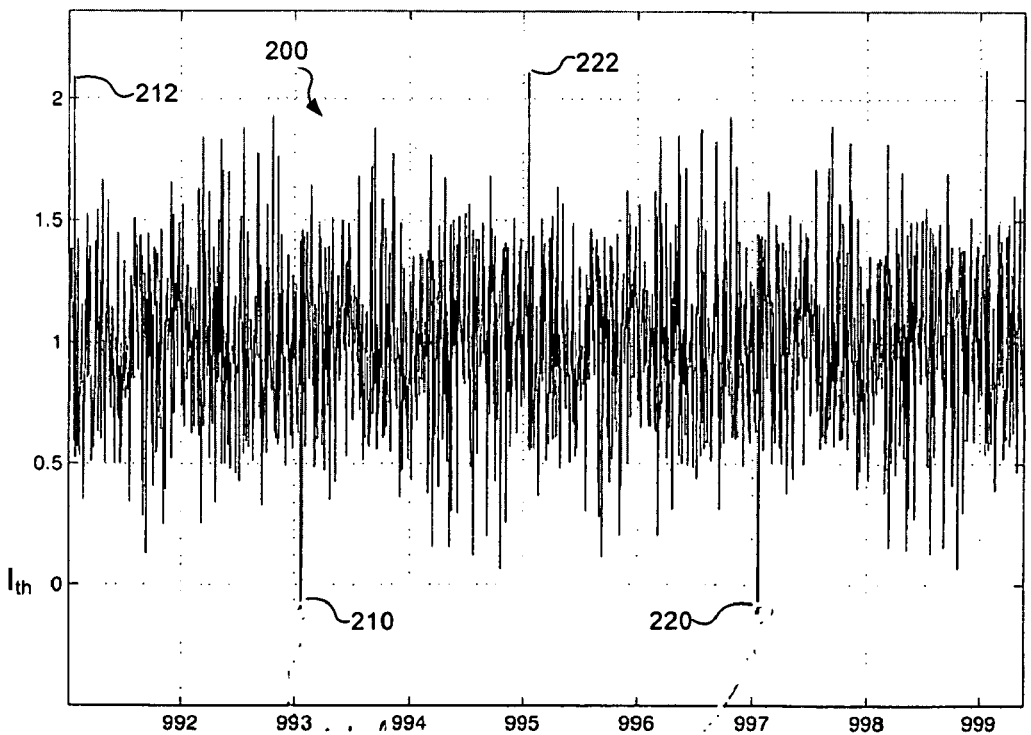

Referring to FIGS. 2A and 2B, an exemplary multichannel RF drive signal 200 is shown. The exemplary multichannel RF drive signal 200 represents 77 channels transmitted with 5% OMI per channel. FIG. 2A shows the RF drive signal 200 over a period of about 4000 μs with a number of peak voltage conditions 202, 204 during which multiple modulated carriers align in phase.

FIG. 2B shows the RF drive signal 200 over a smaller time period (i.e., about 10 μs) during a peak voltage condition. During the peak voltage condition shown in FIG. 2B, the multichannel RF drive signal 200 includes negative spikes or peaks 210, 220 that occur, for example, when carriers align to produce a relatively large swing in drive current in the negative direction. The negative spikes or peaks generally correspond to positive spikes or peaks 212, 222 produced by a corresponding relatively large swing in drive current in the positive direction. Clipping occurs when the negative spikes 210, 220 cause the drive current to fall below a threshold current ($I_{th}$) for the laser. In the exemplary RF drive signal 200, the negative peaks 210, 220 (and the resulting clipping) occur periodically during the peak voltage condition (e.g., about every 4 microseconds (μs)).

Figure 3:
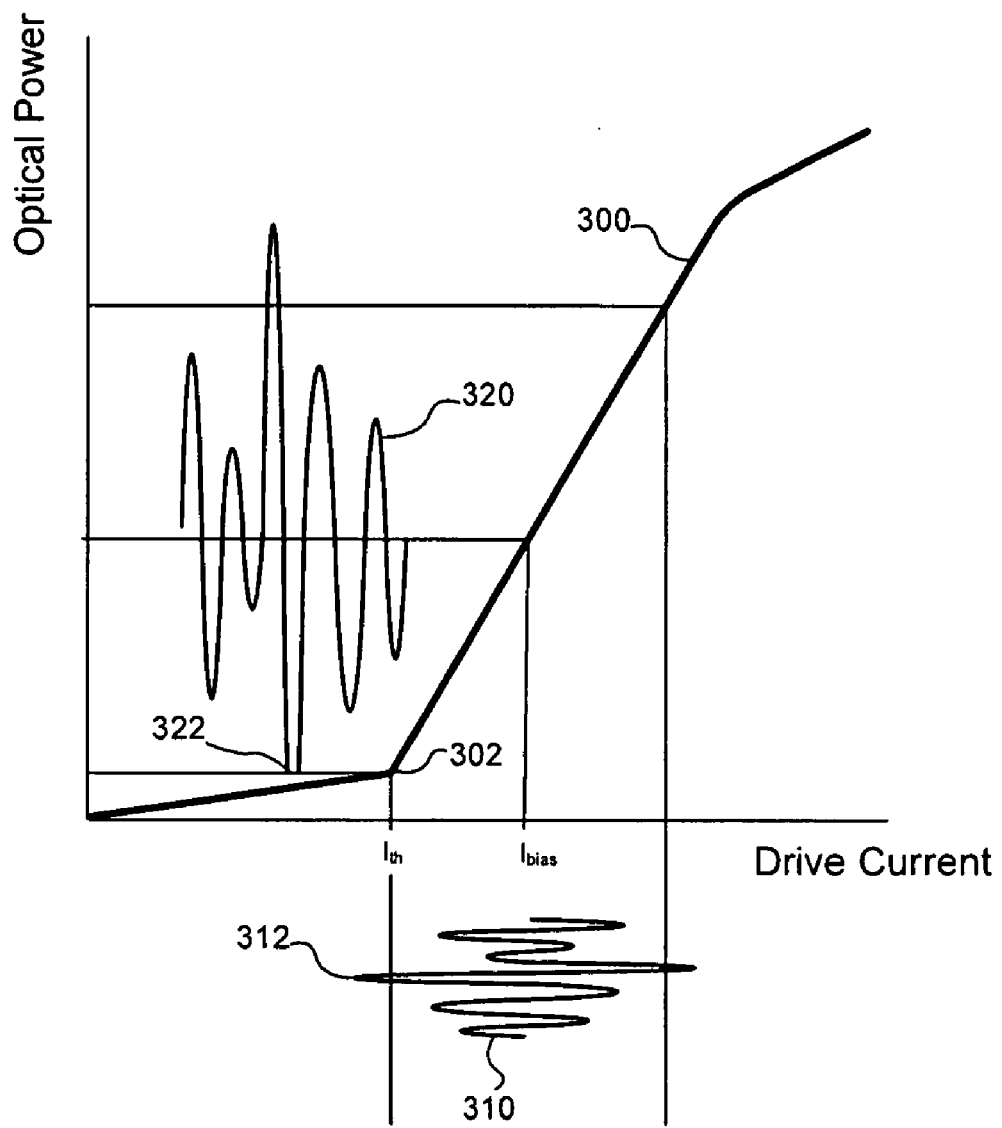
FIG. 3 illustrates a transfer curve showing the relationship between drive current and light output for a laser diode in which clipping occurs.

The laser 112 may include a semiconductor laser, such as a laser diode, having an L-I curve with a sharp knee or point at which the light output reaches a zero level when the input current falls below the threshold current ($I_{th}$). Referring to FIG. 3, a transfer curve 300 of one example of a laser diode illustrates the relationship between drive current (I) and light output (L) of a laser diode. RF signal input waveform 310 represents an RF input applied to the laser diode and optical output waveform 320 represents an optical output produced by the RF signal input. The point 302 (also referred to as the knee) of the transfer curve 300 represents a laser threshold point. When the drive current falls below a threshold current (11h) corresponding to the laser threshold point, there is a sharp discontinuity in the light output. Thus, when the drive current of the RF signal input falls below the threshold current as represented by negative peak 312 in RF input waveform 310, the optical output abruptly stops as represented by the clipped peak 322 in the optical output waveform 320. As will be described in greater detail below, the clipped peak 322 may be restored by combining a replacement tip signal segment with the detected clipped signal.

Figure 4:
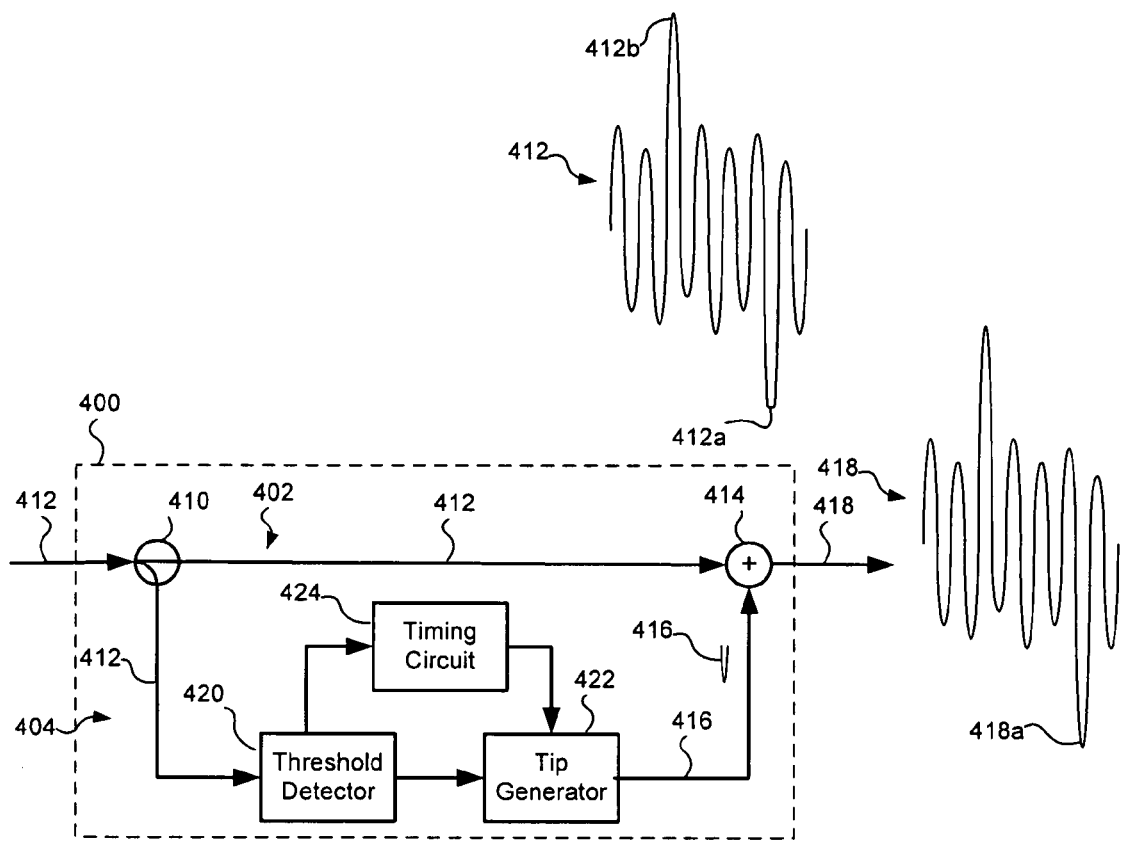
FIG. 4 is a functional block diagram of one embodiment of a clipping correction system.

Referring to FIG. 4, one embodiment of a clipping correction circuit 400 is shown and described in greater detail. The clipping correction circuit 400 may be used in an optical receiver (e.g., the optical receiver 120 shown in FIG. 1) to restore one or more clipped negative peaks in a detected clipped signal. The clipping correction circuit 400 may also be used to correct clipped signals in other systems.

The clipping correction circuit 400 may include a primary signal path 402 and a secondary signal path 404. A splitter 410 may be coupled to the primary and secondary signal paths 402, 404 to split a detected clipped signal 412 between the paths 402, 404. The primary signal path 402 carries the clipped signal 412, which includes at least one clipped negative peak 412a and at least one corresponding positive peak 412b. Although the clipped signal is illustrated with only one clipped negative peak 412a and one corresponding positive peak 412b for purposes of simplicity, an actual clipped signal (e.g., a detected clipped RF signal) may include numerous clipped negative peaks and corresponding positive peaks. The secondary signal path 404 generates one or more replacement tip signal segments 416 that coincide with at least some of the clipped negative peaks 412a in the clipped signal 412. Summing circuitry 414 may be coupled between the primary and secondary signal paths 402, 404 to combine the replacement tip signal segment(s) 416 with the clipped signal 412 to produce a restored signal 418 with a restored negative peak 418a.

According to the illustrated embodiment, the secondary signal path 404 includes a threshold detector 420 configured to detect when the clipped signal 412 on the secondary path 404 exceeds a trigger threshold indicating that a trigger peak has occurred in the clipped signal 412. The trigger peak is a peak in the clipped signal 412 that precedes a clipped negative peak to be restored indicating that the clipped negative peak will occur. The trigger peak may be a positive peak with the threshold detector 420 detecting when the clipped signal 412 exceeds a positive trigger threshold. Where the clipped negative peak 412a is to be restored, for example, the trigger peak may be the corresponding positive peak 412b in the clipped signal 412. The trigger peak may also be a negative peak (e.g., a previous clipped peak) with the threshold detector 420 detecting when the clipped signal 412 falls below a negative trigger threshold. In either case, the trigger peak indicates that clipping will occur in one or more negative peaks following the trigger peak.

The illustrated embodiment of the secondary signal path 404 also includes a replacement tip generator 422 that generates the replacement tip signal segments 416 in response to the detection of a trigger peak. The replacement tip generator 422 may generate replacement tip signal segments 416 that fit the clipped end of the clipped negative peak to be restored. As used herein, "fit" refers to having a size and shape substantially corresponding to the clipped end such that the clipped negative peak is restored and does not require a replacement tip signal segment that is the exact size and shape of an unclipped negative peak tip.

The secondary signal path 404 may also include a timing circuit 424 that times the combination of the replacement tip signal segment(s) 416 with the clipped signal 412 such that the replacement tip signal segment 416 coincides with a clipped end of a clipped negative peak to be restored (e.g., clipped negative peak 412a). As used herein, "coincide" refers to the replacement tip signal segment 416 being combined with the clipped signal 412 at around the same time as the clipped negative peak such that the clipped negative peak is restored but does not require exact timing. The timing circuit 424 may respond to the detection of a threshold by the threshold detector 420 and may cause the replacement tip signal segment 416 to be combined at a clipped peak occurrence time following some detected threshold, as will be described in greater detail below.

Figure 5A:
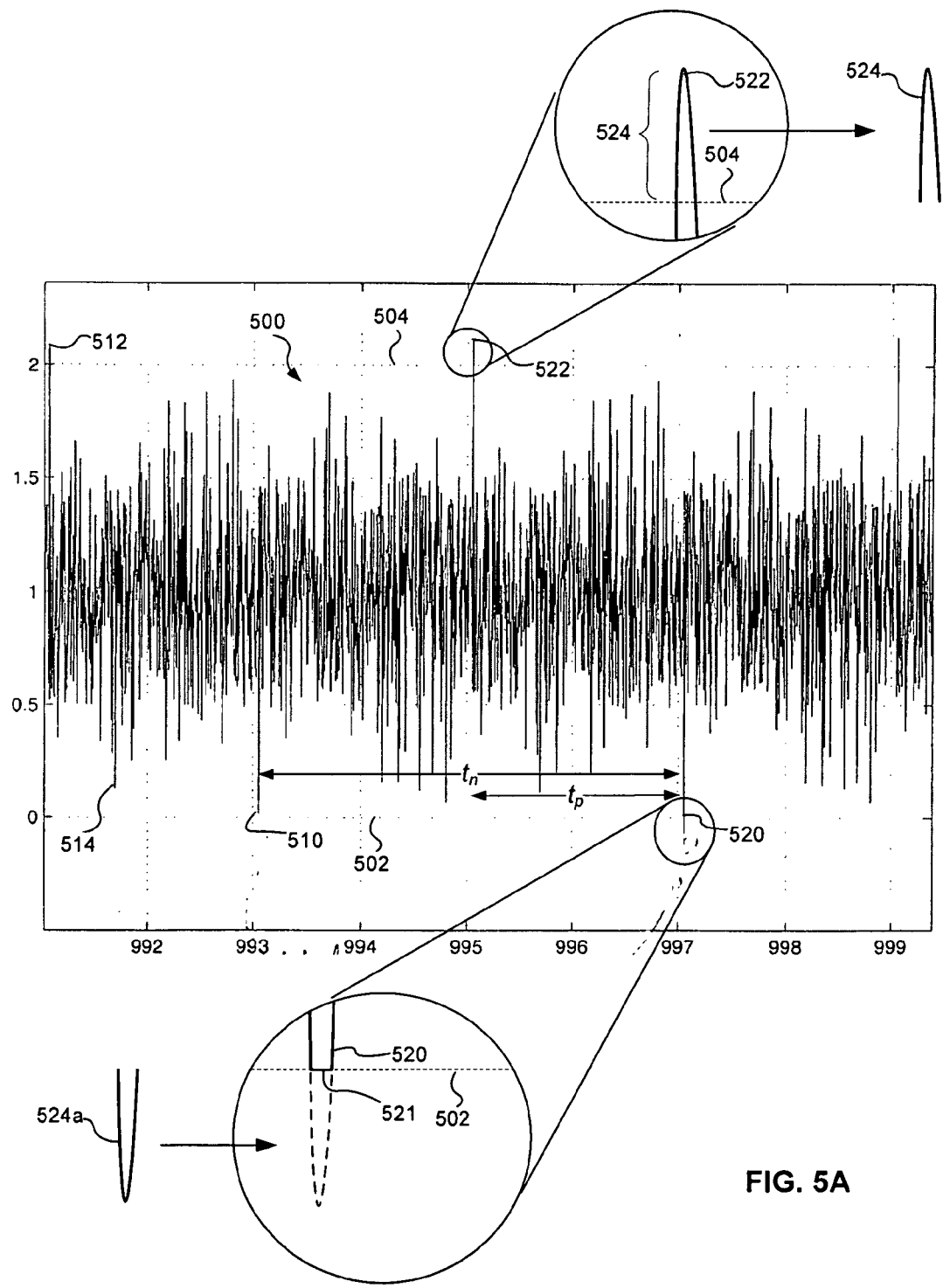
FIG. 5A illustrates restoration of a clipped negative peak in a clipped signal using a replacement tip signal segment from a corresponding positive peak and timed from a preceding detected peak, consistent with one embodiment of the present disclosure.
Figure 5B:
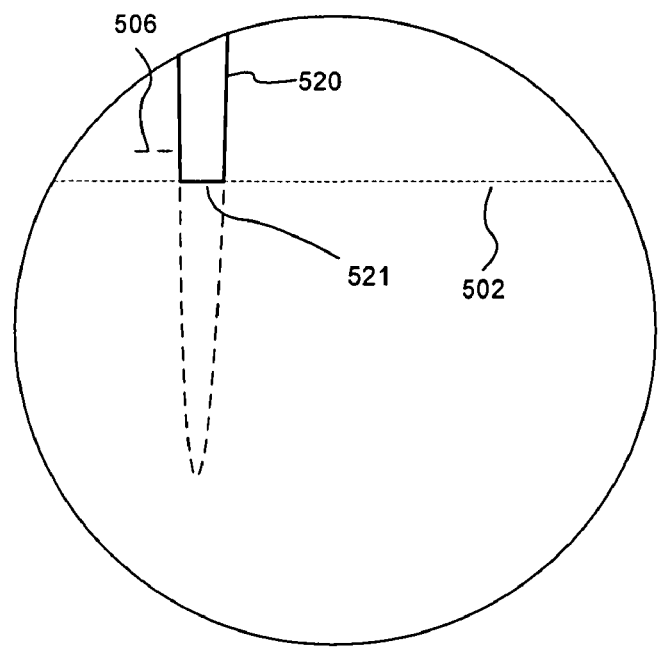
FIG. 5B illustrates restoration of a clipped negative peak in a clipped signal using a replacement tip signal segment timed from the clipped peak falling below a clipping indication threshold, consistent with another embodiment of the present disclosure.
Figure 5C:
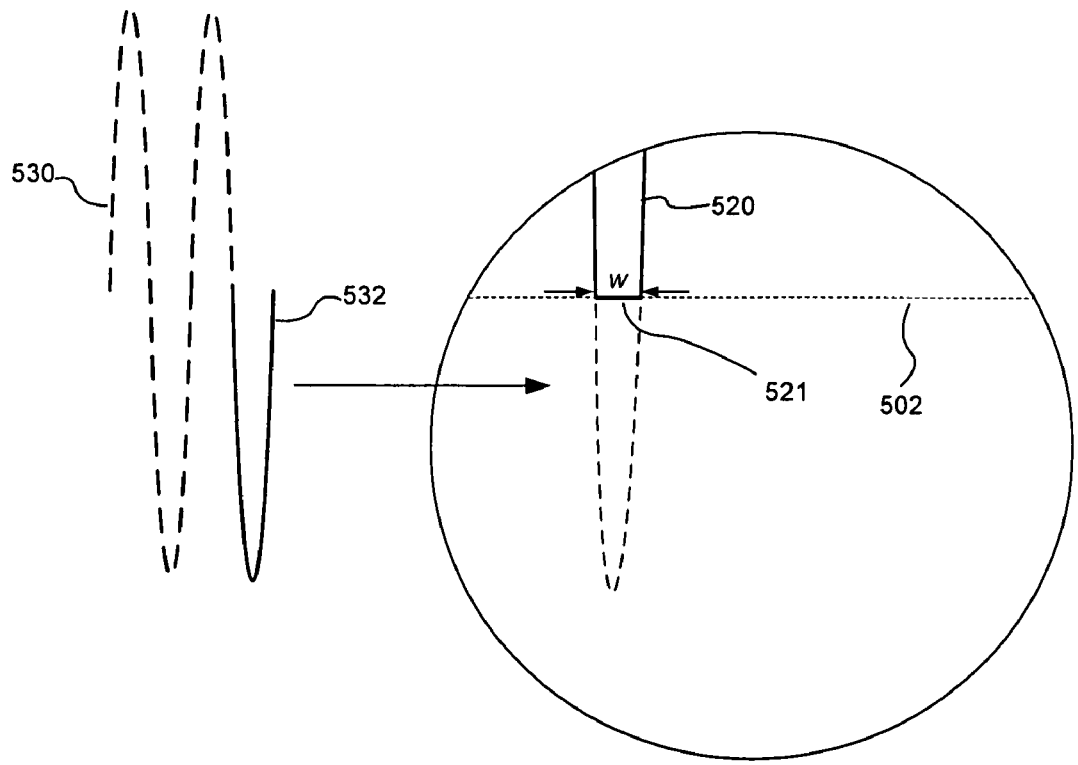
FIG. 5C illustrates restoration of a clipped negative peak in a clipped signal using a replacement tip signal segment from a waveform portion, consistent with a further embodiment of the present disclosure.

Referring to FIGS. 5A-5C, different methods of detecting trigger peaks, generating replacement tip signal segments, and timing the replacement tip signal segments are described in greater detail in connection with an exemplary detected clipped RF signal 500 including clipped negative peaks 510, 520 and corresponding positive peaks 512, 522. The clipped negative peaks 510, 520 are clipped below a clipping threshold 502. When positive peaks 512, 522 exceed a threshold 504 corresponding to the clipping threshold 502, the positive peaks 512, 522 indicate that clipped negative peaks 510, 520 will follow. Thus, a trigger peak may be detected by detecting when a positive peak (e.g., peak 522) exceeds the threshold 504. A trigger peak may also be detected by detecting when a negative peak (e.g., peak 510) reaches the clipping threshold 502 or when a preceding negative peak (e.g., peak 514) falls below some threshold that is sufficiently close to the clipping threshold 502 to predict the occurrence of clipped negative peaks. For example, a trigger peak may be detected by detecting the negative peak 514 having a magnitude that is some percentage (e.g., 80%) of a peak that would have been clipped. In one embodiment, the threshold detector 420 (FIG. 4) may include threshold detection circuitry (e.g., analog or digital) known to those skilled in the art for detecting when a signal exceeds (e.g. either above or below) one or more threshold values used for the trigger peak.

As shown in FIG. 5A, a replacement tip signal segment for a clipped negative peak 520 may be generated from a corresponding positive peak 522. The corresponding positive peak 522 includes a tip portion 524 above the threshold 504 corresponding to the clipping threshold 502. Because of the symmetry of the RF signal 500, the tip portion 524 of the corresponding positive peak 522 has a size and shape that approximates the size and shape of a tip portion that would have been present on the negative peak 520 if it had not been clipped and thus fits the clipped end 521 of the clipped negative peak 520. The tip portion 524 from the corresponding positive peak 522 may be inverted such that the inverted tip portion 524a forms the replacement tip signal segment. The inverted tip portion 524a may be added (e.g., using summing circuitry 414) to the clipped signal 500 to restore the clipped negative peak 520. Instead of inverting and adding the inverted tip portion, the tip portion 524 may be subtracted from the clipped signal 500 (e.g., using summing circuitry 414).

According to one embodiment, the tip generator 422 (FIG. 4) may include circuitry for sampling and storing the tip portion 524 or a portion of the signal 500 including the tip portion 524 of the positive peak 522. The tip generator 422 may also include circuitry for inverting the sampled tip portion 524.

FIG. 5A also illustrates one method of timing the combination of a replacement tip signal segment (e.g., the inverted tip portion 524a) with the detected clipped signal 500. As mentioned above, the negative peaks 510, 520 and the positive peaks 512, 522 occur periodically and thus are spaced at predictable time intervals. In the illustrated RF signal 500, for example, the negative clipped peaks 510, 520 occur about 4 microseconds (µs) from each other and the negative clipped peaks 510, 520 occur about 2 microseconds (µs) following the corresponding positive peaks 512, 522. Thus, clipped peak occurrence times may be determined relative to preceding detected peaks (e.g., the trigger peak). In this example, a peak occurrence time $t_p$ relative to the corresponding positive peak is 2 microseconds (µs) and a peak occurrence time $t_n$ relative to a preceding negative clipped peak 510 is 4 microseconds (µs). The combination of the replacement tip signal segment (e.g., inverted tip portion 524a) with the clipped RF signal 500 may be timed according to at least one of these peak occurrence times following the detection of a preceding peak such that the replacement tip portion coincides with the clipped end 521 of the clipped negative peak 520. The system may be calibrated initially to determine the time intervals or peak occurrence times and may also be adjusted over time as it drifts.

According to one embodiment, the timing circuit 424 (FIG. 4) may include circuitry that triggers a timer (e.g., a 2 µs timer) in response to detecting a trigger peak (e.g., corresponding peak 522). The timing circuit 424 may also include circuitry that causes the replacement tip signal segment to be combined after the timer reaches the peak occurrence time (e.g., after $t_p$=2 µs). If the tip generator 422 includes circuitry for sampling and storing a tip portion 524, for example, the timing circuit 424 may include circuitry that causes the sampled tip portion 524 to be released when the timer reaches the peak occurrence time.

FIG. 5B illustrates another method of timing the combination of the replacement tip signal segments. According to this embodiment, a clipping indication threshold 506 may be set just prior to the clipping threshold 502 and the replacement tip signal segment (e.g., the inverted tip portion 524a) may be added in response to detection of the clipping indication threshold 506. The clipping indication threshold 506 may depend on the delays on the primary and secondary signal paths. The system may be calibrated to set the clipping indication threshold 506 such that the replacement tip signal segment (e.g., on the secondary signal path) coincides with the clipped end 521 of the clipped signal 500 (e.g., on the primary signal path).

In one embodiment, the threshold detector 420 (FIG. 4) may include circuitry for detecting when the negative peak passes the clipping indication threshold 506 (e.g., in addition to detecting the trigger peak). The timing circuit 424 may include circuitry that causes the tip generator 422 to provide a replacement tip signal segment in response to detection of the clipped peak 520 falling below the clipping indication threshold 506.

FIG. 5C illustrates a further method of generating a replacement tip signal segment by generating a portion 532 of a waveform 530 generated using a sine function. The waveform portion 532 may be generated to fit the width w of the clipped end 521 of the clipped negative peak 520 to be restored. The waveform portion 532 may also be generated to approximate a length of the tip being replaced.

According to one embodiment, the tip generator 422 (FIG. 4) may include circuitry for measuring the width w of the clipped end 521 of the clipped negative peak 520 and a waveform generator to generate the waveform portion 532 having a frequency such that the waveform portion fits the measured width w. The clipped negative peak 520 may be digitized so that the width w of the clipped end 521 may be measured. For example, the width w of the clipped end 521 can be measured using a fast analog to digital converter followed by a digital signal processor.

Accordingly, the embodiments of the clipping correction system and method describe herein may correct clipping in a receiver by generating replacement tip signal segments. The replacement tip signal segments may be generated in response to detecting a trigger peak that predicts the occurrence of a clipped negative peak, which facilitates the clipping correction, for example, by avoiding unnecessary delays.

Consistent with one embodiment, a method is provided for correcting a clipped signal. The method includes: detecting a clipped modulated optical signal to produce a clipped electrical signal, the clipped electrical signal including at least one clipped negative peak and a corresponding positive peak preceding the clipped negative peak; detecting at least one trigger peak in the clipped electrical signal preceding at least one clipped negative peak to be restored, wherein the trigger peak indicates an occurrence of the clipped negative peak to be restored; responsive to detecting the trigger peak, generating a replacement tip signal segment for the clipped negative peak to be restored; and combining the replacement tip signal segment and the clipped electrical signal such that the replacement tip signal segment coincides with a clipped end of the clipped negative peak to be restored to produce a restored negative peak.

Consistent with another embodiment, a clipping correction system is provided for correcting a clipped signal including a series of clipped negative peaks and corresponding positive peaks preceding the clipped negative peaks. The clipping correction system includes a primary signal path configured to carry the clipped signal and at least one secondary signal path coupled to the primary signal path and configured to receive at least a portion of the clipped signal. The secondary signal path is configured to generate replacement tip signal segments that coincide with at least some of the clipped negative peaks in the clipped signal in response to detecting at least one trigger peak indicating the occurrence of the clipped negative peaks. The system also includes summing circuitry configured to combine the replacement tip signal segments on the secondary signal path with the clipped signal on the primary signal path.

Consistent with a further embodiment, a receiver includes an optical signal detector configured to detect a clipped modulated optical signal and to convert the clipped modulated optical signal into a clipped electrical signal and a clipping correction system. The clipping correction system includes a primary signal path configured to carry the clipped signal and at least one secondary signal path coupled to the primary signal path and configured to receive at least a portion of the clipped signal. The secondary signal path is configured to generate replacement tip signal segments that coincide with at least some of the clipped negative peaks in the clipped signal in response to detecting at least one trigger peak indicating the occurrence of the clipped negative peaks. The clipping correction system also includes summing circuitry configured to combine the replacement tip signal segments on the secondary signal path with the clipped signal on the primary signal path.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of correcting a clipped signal, comprising:
   detecting a clipped modulated optical signal to produce a clipped electrical signal, the clipped electrical signal including at least one clipped negative peak and a corresponding positive peak preceding the clipped negative peak;
   detecting at least one trigger peak in the clipped electrical signal preceding at least one clipped negative peak to be restored, wherein the trigger peak indicates an occurrence of the clipped negative peak to be restored;
   responsive to detecting the trigger peak, generating a replacement tip signal segment for the clipped negative peak to be restored; and
   combining the replacement tip signal segment and the clipped electrical signal such that the replacement tip signal segment coincides with a clipped end of the clipped negative peak to be restored to produce a restored negative peak.

2. The method of claim 1 wherein generating the replacement tip signal segment comprises sampling and storing a tip portion of a corresponding positive peak preceding the clipped negative peak to be restored.

3. The method of claim 2 wherein combining the replacement tip signal segment and the clipped electrical signal comprises inverting the tip portion of the corresponding positive peak and adding the inverted tip portion to the clipped electrical signal.

4. The method of claim 2 wherein combining the replacement tip signal segment and the clipped electrical signal comprises subtracting the tip portion of the corresponding positive peak from the clipped electrical signal.

5. The method of claim 1 wherein generating the replacement tip signal segment comprises generating a waveform portion configured to fit the clipped end of the clipped negative peak to be restored.

6. The method of claim 5 further comprising digitizing at least a clipped end of a clipped negative peak and measuring a width of the clipped end of the clipped negative peak, wherein the waveform portion is generated to fit the measured width.

7. The method of claim 1 further comprising determining a clipped peak occurrence time relative to a preceding peak, and wherein the replacement tip signal segment is combined with the clipped electrical signal at the clipped peak occurrence time following detection of the preceding peak such that the replacement tip signal segment coincides with the clipped end of the clipped peak to be restored.

8. The method of claim 7 wherein the preceding peak is the trigger peak.

9. The method of claim 1 further comprising detecting when the clipped peak to be restored falls below a clipping indication threshold, and wherein the replacement tip signal segment is combined with the clipped electrical signal responsive to detecting the clipping indication threshold such that the replacement tip signal segment coincides with the clipped end of the clipped peak to be restored.

10. The method of claim 1 wherein the trigger peak is a corresponding positive peak preceding the clipped negative peak to be restored.

11. A clipping correction system for correcting a clipped signal, the clipped signal including a series of clipped negative peaks and corresponding positive peaks preceding the clipped negative peaks, the system comprising:
   a primary signal path configured to carry the clipped signal, wherein the clipped signal is a clipped electrical signal produced by detecting a clipped modulated optical signal;
   at least one secondary signal path coupled to the primary signal path and configured to receive at least a portion of the clipped signal, the secondary signal path being configured to generate replacement tip signal segments that coincide with at least some of the clipped negative peaks in the clipped signal in response to detecting at least one trigger peak indicating the occurrence of the clipped negative peaks; and
   summing circuitry configured to combine the replacement tip signal segments on the secondary signal path with the clipped signal on the primary signal path.

12. The clipping correction system of claim 11 wherein the secondary signal path comprises:
   a threshold detector configured to detect when the clipped signal on the secondary signal path exceeds a trigger threshold indicating that a trigger peak has occurred in the clipped signal, the trigger peak preceding a clipped negative peak to be restored;
   a replacement tip generator configured to generate a replacement tip signal segment for the clipped negative peak to be restored; and
   a timing circuit configured to time the combination of the replacement tip signal segment and the clipped signal such that the replacement tip signal segment coincides with a clipped end of the clipped negative peak to be restored to produce a restored negative peak.

13. The clipping correction system of claim 12 wherein the replacement tip generator includes circuitry configured to sample and store a tip portion of one of the corresponding positive peaks preceding the clipped negative peak to be restored.

14. The clipping correction system of claim 13 wherein the replacement tip generator further includes circuitry configured to invert the tip portion of the one of the corresponding positive peaks, and wherein the summing circuitry is configured to add the inverted tip portion with the clipped signal.

15. The clipping correction system of claim 12 wherein the replacement tip generator includes a waveform generator configured to generate a waveform portion that fits the clipped end of the clipped negative peak to be restored.

16. The clipping correction system of claim 15 wherein the replacement tip generator includes circuitry configured to measure the width of the clipped end of the preceding clipped negative peak, and wherein the waveform generator is configured to generate a waveform portion to fit the measured width.

17. The clipping correction system of claim 12 wherein the timing circuit is configured to time the combination of the replacement tip signal segment with the clipped signal at a clipped peak occurrence time following detection of a preceding peak such that the replacement tip signal segment coincides with the clipped end of the clipped peak to be restored.

18. The clipping correction system of claim 12 wherein the threshold detector is configured to detect when the clipped peak to be restored falls below a clipping indication threshold, and wherein the timing circuit is configured to time the combination of the replacement tip signal segment with the clipped signal responsive to detection of the clipping indication threshold such that the replacement tip signal segment coincides with the clipped end of the clipped peak to be restored.

19. A receiver comprising:
  an optical signal detector configured to detect a clipped modulated optical signal and to convert the clipped modulated optical signal into a clipped electrical signal; and
  a clipping correction system comprising:
    a primary signal path configured to carry the clipped signal, wherein the clipped signal is a clipped electrical signal produced by detecting a clipped modulated optical signal;
    at least one secondary signal path coupled to the primary signal path and configured to receive at least a portion of the clipped signal, the secondary signal path being configured to generate replacement tip signal segments that coincide with at least some of the clipped negative peaks in the clipped signal in response to detecting at least one trigger peak indicating the occurrence of the clipped negative peaks; and
    summing circuitry configured to combine the replacement tip signal segments on the secondary signal path with the clipped signal on the primary signal path.

20. The receiver of claim 19 wherein the secondary signal path comprises:
  a threshold detector configured to detect when the clipped signal on the secondary signal path exceeds a trigger threshold indicating that a trigger peak has occurred in the clipped signal, the trigger peak preceding a clipped negative peak to be restored;
  a replacement tip generator configured to generate a replacement tip signal segment for the clipped negative peak to be restored; and
  a timing circuit configured to time the combination of the replacement tip signal segment and the clipped signal such that the replacement tip signal segment coincides with a clipped end of the clipped negative peak to be restored to produce a restored negative peak.

* * * * *